(12) United States Patent
Seils et al.

(10) Patent No.: US 6,176,139 B1
(45) Date of Patent: Jan. 23, 2001

(54) COMPRESSION-TENSION TRANSDUCER, ESPECIALLY FOR ELECTROMECHANICAL BRAKING SYSTEMS

(75) Inventors: Wolfgang Seils, Ludwigsburg; Georg Blosch, Murr, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 08/983,078

(22) PCT Filed: Jul. 9, 1997

(86) PCT No.: PCT/DE97/01444

§ 371 Date: Jun. 16, 1998

§ 102(e) Date: Jun. 16, 1998

(87) PCT Pub. No.: WO98/03844

PCT Pub. Date: Jan. 29, 1998

(30) Foreign Application Priority Data

Jul. 17, 1996  (DE) ............................................... 196 28 814

(51) Int. Cl.$^7$ ................ G01L 1/26; B60T 8/52
(52) U.S. Cl. ................ 73/774; 73/781; 73/796; 73/862.041
(58) Field of Search ............................... 73/121, 129, 767, 73/774, 781, 782, 796, 794, 831, 860, 862.041, 862.044, 862.045, 862.08, 862.322, 862.325, 862.381, 862.625, 862.68

(56) References Cited

U.S. PATENT DOCUMENTS

| | | |
|---|---|---|
| 2,920,880 | 1/1960 | Laycock . |
| 3,036,283 * | 5/1962 | Singdale et al. ........................ 73/781 |
| 3,110,175 * | 11/1963 | Seed ...................................... 73/781 |
| 3,399,564 | 9/1968 | Freightliner . |
| 3,572,102 * | 3/1971 | Baratta .................................. 73/796 |
| 4,088,907 * | 5/1978 | Jones et al. ........................... 73/794 |
| 4,472,976 * | 9/1984 | Bonfils .................................. 73/781 |
| 5,279,394 | 1/1994 | Lucas . |
| 5,410,911 | 5/1995 | Sab Wabco . |
| 5,490,427 * | 2/1996 | Yee et al. .............................. 73/767 |

FOREIGN PATENT DOCUMENTS 0 566 133 B1   10/1993  (EP) .

* cited by examiner

*Primary Examiner*—George Dombroske
(74) *Attorney, Agent, or Firm*—Michael J. Striker

(57) ABSTRACT

A pressure force sensor has two oppositely located connectors for a force introduction to an inside located force sensor module which emits an output signal as a function of an external pressure force, a fork arm attached to each of the connectors and having two fork ends which are offset by 90° and enclose the force sensor module, and pressure elements located between respective bases of the fork arms and a force introduction surface of the force sensor module, the pressure elements being also laterally enclosed by angled sections of the fork ends, so that pressure forces as well as tensile forces can be passed from the connectors to the force introduction surface of the force sensor module.

5 Claims, 2 Drawing Sheets

COMPRESSION-TENSION TRANSDUCER, ESPECIALLY FOR ELECTROMECHANICAL BRAKING SYSTEMS

BACKGROUND OF THE INVENTION

The invention relates to a pressure force sensor, in particular for the detection and control of wheel braking forces in connection with electro-mechanical brake systems for motor vehicles.

In connection with a brake device for motor vehicles known from EP 0 566 133 B1, the required braking force is transferred to the wheels by means of a hydraulic servo unit. The cylinder pressure generated by pushing the brake pedal down is measured in a main cylinder, and this measured value is employed as a control signal for a hydraulic control device for optimizing the braking effect.

It is necessary, in particular in connection with electro-mechanical braking systems, to detect suitable control values for optimizing the braking effect individually at each wheel, which can then be supplied to an electronic control device. With brake systems controlling the wheel brake force or respectively the wheel brake torque, it is useful to detect these wheel brake forces or respectively torque directly at the wheel, if possible.

SUMMARY OF THE INVENTION

The pressure sensor in accordance with the present invention has a fork arm attached to each connector and having two forked ends which are offset by 90° and enclose the force sensor module, and pressure elements are located between the bases of the fork arms and the force introduction surface of the force sensor module, which are laterally also enclosed by angled sections of the fork ends so that pressure forces as well as tensile forces can be passed from the connectors to the force introduction surface of the force sensor module.

The pressure sensor in accordance with the invention can be employed for the detection of all braking torques transmitted at the braked wheel and which makes a suitable signal available for further processing in a brake control device.

Magneto-elastic pressure sensors are used in an advantageous manner, which are customarily used for sensing pressure forces which, for example, also suffices for controlling forces in the brake calipers of the brake system. In accordance with the invention, the requirement for two pressure sensors for making a torque control for forward and reverse driving possible is avoided in a simple manner. The problem of force introduction and the zero drift point in connection with overloads under changing load conditions, such as can occur in connection with single sensor concepts during forward and reverse travel, has been solved in accordance with the invention.

A conversion of tensile and pressure forces, while keeping the pressure force introduction, is therefore possible in a particularly advantageous manner with the pressure sensor in accordance with the invention, because of which a use of the pressure force/pressure sensor for detecting changing tensile and pressure forces can also be employed for general force sensing purposes.

A control of the wheel brake torque can be performed in a simple manner by detecting the support force in the mechanical brake device at a torque support which transmits tensile and pressure forces, wherein the wheel brake is hingedly seated and is supported by this torque support. A control of the braking torque in electronically controlled brake systems with alternating load directions is possible with only one pressure force sensor for both directions by using the output signal of the pressure sensor.

Embodiments which are also advantageous are recited in the further dependent claims.

BRIEF DESCRIPTION OF THE DRAWINGS

An exemplary embodiment of a pressure sensor in accordance with the invention will be explained by means of the drawings. Shown are in.

DESCRIPTION OF THE PREFERRED EMBODIMENT

Figure 1:
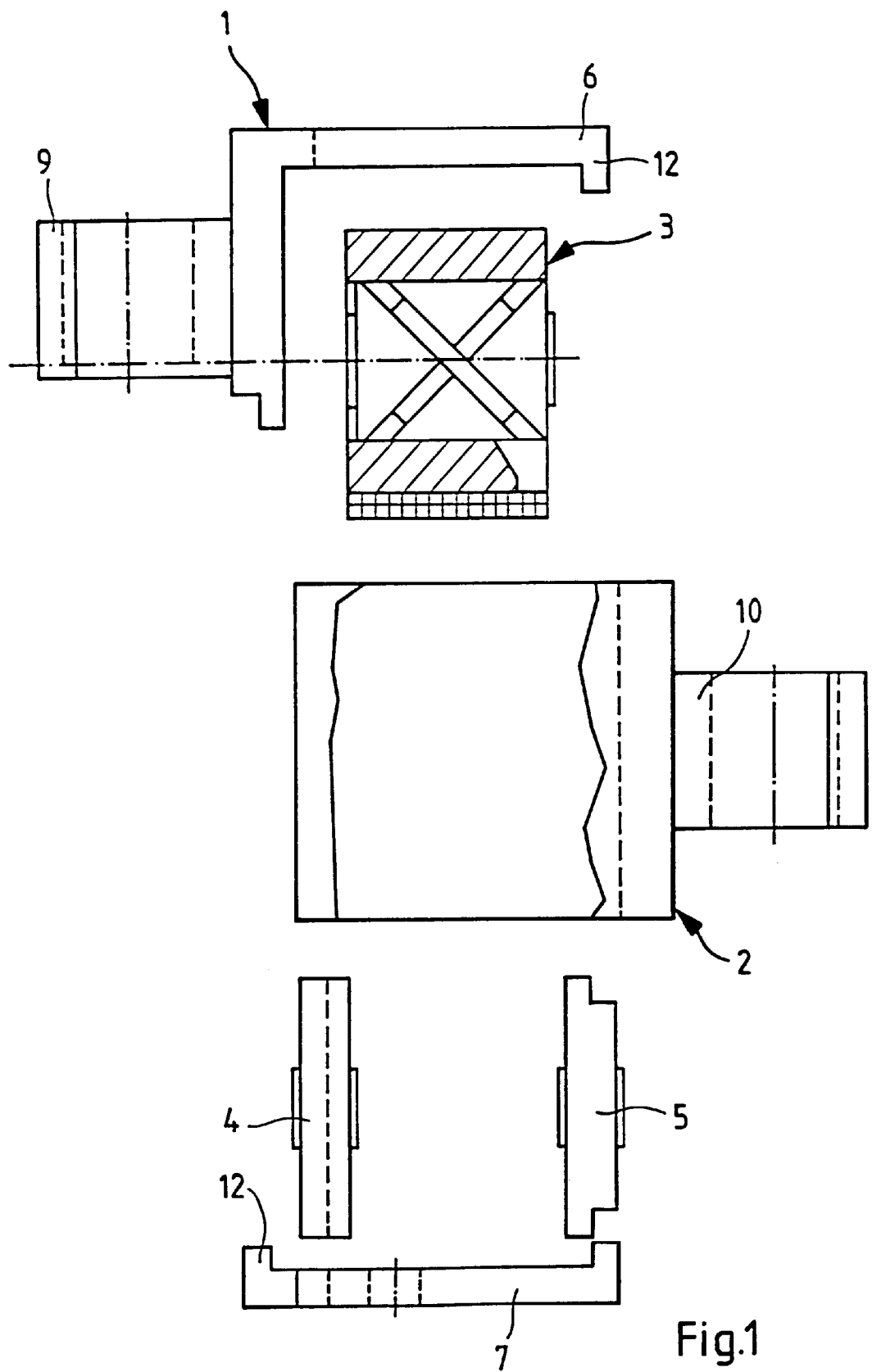
FIG. 1, a representation of the parts of the pressure sensor.
Figure 2:
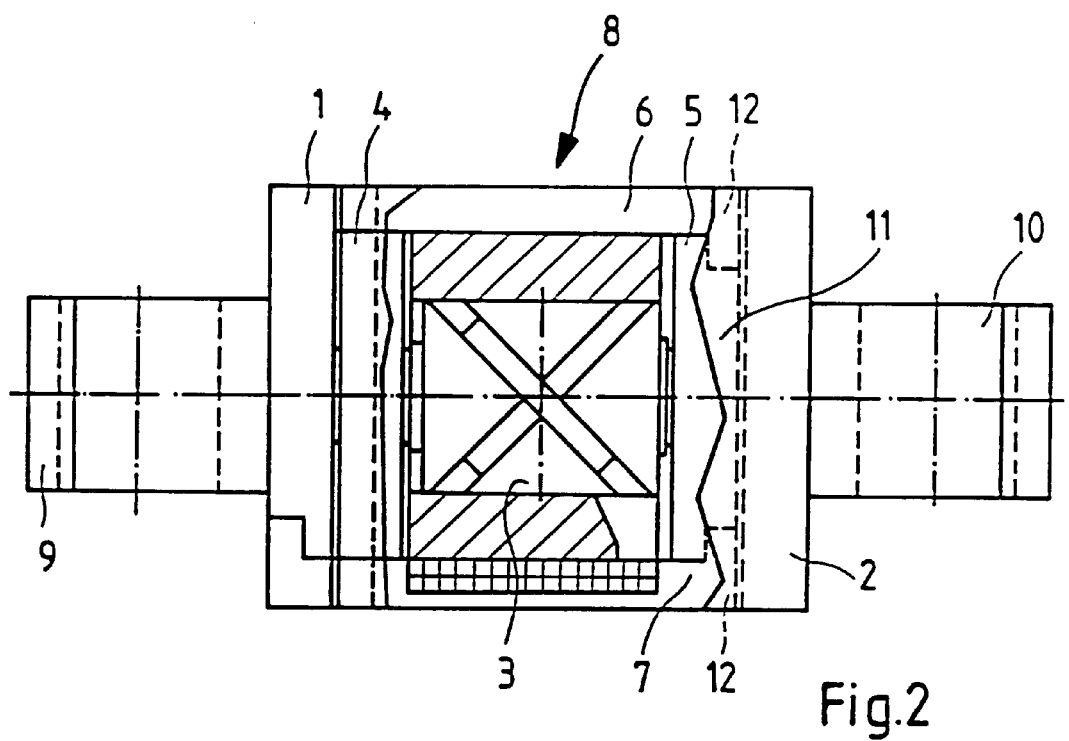
FIG. 2, the assembled ready-to-function pressure sensor.

Parts of a pressure sensor, which has a not completely assembled fork arm 1 (see the lateral view on top) and a fork arm 2 (see the top view in the center), are represented in FIG. 1. A force sensor module 3 and respective pressure elements 4 and 5 are furthermore represented. The fork arm 1 has a fixedly mounted fork end 6 (see the top) and a fork end 7, which can be attached at the end of assembly. Reference is made to FIG. 2, which shows the assembled pressure sensor 8, for explaining the functioning of the pressure sensor.

Oppositely located connectors 9 and 10 are located on the fork arms 1 and 2, on which the tensile or pressure force to be detected acts. A possible employment of the pressure sensor for detecting braking forces at motor vehicle wheels can be taken from the prior art, EP 0 566 133 B1 (FIG. 1), wherein a pressure sensor is housed in a hydraulic servo unit, and the pressure forces between the wheel brake and a torque support are detected.

In accordance with FIG. 2, the cube-shaped magneto-elastic force sensor module 3 is enclosed by the two fork arms 1 and 2, which are respectively turned by 90° in relation to each other. The fork ends 6 and 7, as well as the fork end 11 and the fork end, not visible, of the fork arm 2, here engage respectively one of the pressure elements 4 and 5 by means of angled sections 12 in such a way that tensile forces are also introduced as pressure forces via the pressure elements 4 and 5 into the force sensor module 3.

Thus, with the exertion of pressure on the connectors 9 and 10, the pressure force is transferred directly at the bases of the fork arms 1 and 2 via the pressure elements 4 and 5 to the force sensor module 3. With the connectors 1 and 2 put under a tensile load, the angled sections 12 of the fork ends transfer the force to the force sensor module 3 and an output signal can be generated in the same way. As long as only tensile forces occur, the pressure elements 4 and 5 could also be fixedly connected with the fork arms 1 and 2.

In case of a change of the direction of pressure, all forces acting on the force sensor module 3 must be detected. For this it is necessary that these pressure elements 4 and 5 can be disengaged in the direction of pressure and that therefore the pressure elements 4 and 5 rest on the one side directly against the base of the fork arms 1 and 2 and on the other side on the force introduction surface of the force sensor module 3.

For an improved assembly capability, the one fork arm 1 is divided in the area of a contact zone with the force sensor module 3 and has, as described above, a separate fork end 7, which is attached in such a way that an assembly is made possible in spite of interfering contours, for example for cable lead-throughs for the force sensor module 3, etc.

In an embodiment not represented here, the fork arm 1 for example can also form a unit with the pressure element 4, wherein the required disengagement can be realized by a loose engagement of the fork arm 1 on the connector 9.

In a reversal of the principle of force reversal it is furthermore possible to embody the pressure elements 4 and 5 in a fork shape and in place thereof to use appropriately simpler connectors 9 and 10.

The design of the force sensor module 3 can be in accordance with conventional techniques, for example as described with a magneto-elastic module, wherein minor changes of the mechanical shape by pressure action lead to a change of the magnetic properties, and this change can be electronically evaluated. A design with wire strain gauges, which experience a change in electrical resistance when mechanically stressed, can be employed here without departing from the principle of the invention. Other elements suitable for detecting pressure force, which undergo a change of their electrical properties under mechanical stresses, can also be employed here.

What is claimed is:

1. A pressure force sensor, comprising two oppositely located connectors for a force introduction to an inside located force sensor module which emits an output signal as a function of an external pressure force; a fork arm attached to each of said connectors and having two fork ends which are offset by 90° and enclose the force sensor module; and pressure elements located between respective bases of said fork arms and a force introduction surface of the force sensor module, said pressure elements being also laterally enclosed by angled sections of said fork ends, so that pressure forces as well as tensile forces can be passed from said connectors to the force introduction surface of the force sensor module.

2. A pressure force sensor as defined in claim 1, wherein said at least one of said fork arms is composed of two pieces, one of said fork ends of a respective one of said fork arms being attachable to said fork arm after the pressure force sensor has been assembled.

3. A pressure force sensor as defined in claim 2, wherein a removable fork end is composed of one piece with one of said pressure elements, one of said connectors associated with this fork arm being loosely held on this fork arm.

4. A pressure force sensor as defined in claim 1, wherein said fork arms are formed of one piece with said pressure elements, said connectors associated with said fork arms being loosely held on a respective one of said fork arms.

5. A pressure force sensor as defined in claim 1, wherein the force sensor module is a magneto-electric force sensor.

* * * * *